Patented Apr. 12, 1949

2,466,667

UNITED STATES PATENT OFFICE 2,466,667

CORE OIL AND CORE COMPOSITIONS

Charles L. Thomas, Riverside, Ill., assignor to Universal Oil Products Company, Chicago, Ill., a corporation of Delaware No Drawing. Application September 22, 1944, Serial No. 555,398

6 Claims. (Cl. 22—188)

This invention relates to an improved type of core oil and sand cores compounded therewith.

It is one object of this invention to provide an improved binder for the manufacture of baked sand cores which will give improved results when compared to conventional core binders and which utilizes materials which heretofore have been considered waste.

The material which forms the basis for the present invention is so-called sludge hydrocarbons. This material is a byproduct of several processes including isomerization of paraffin hydrocarbons in the presence of various metal halide catalysts such as aluminum chloride, and the alkylation and cracking of hydrocarbons in the presence of similar catalysts. Sludge hydrocarbons are also produced in the process for the alkylation of isoparaffins with olefins in the presence of hydrogen fluoride as the catalyst. It is also possible to manufacture the sludge hydrocarbons directly by reacting mono-olefins with various metal halides or hydrogen fluoride.

The sludge hydrocarbons may be recovered from the catalyst phases formed in the above-mentioned processes, and although the reaction conditions under which the catalyst phase is formed may vary over a wide range they must be carefully controlled. As the temperature increases, the sludge hydrocarbon material contains less conjugated unsaturation and more compounds which are aromatic in character. Even at moderate temperatures this undesirable drop in the amount of conjugated unsaturation occurs if the reaction is continued for excessive lengths of time.

In general, the sludge hydrocarbons comprise a series of high molecular weight cyclic compounds of wide boiling range but homogeneous structure of which a large portion contains conjugated double bond systems, although the exact composition of the sludge hydrocarbons will vary somewhat depending upon the particular charging stock used, the catalyst, and the conditions of operation employed. The material has a wide boiling range of about 150 to above 450° C., a density of about 0.83 to 0.93, an index of refraction of from about 1.47 to 1.53, a specific dispersion of from about 125 to 175, a bromine number greater than 140, maleic anhydride values of approximately 30 to 90, and an acid number below 3. The average molecular weight of the sludge hydrocarbons varies from about 200 to 400, although it is generally in the neighborhood of 300. Fractions of the sludge hydrocarbons may have molecular weights as low as 150 and as high as 1000.

In one method of making sludge hydrocarbons a hydrocarbon charge containing olefins is treated in the presence of hydrogen fluoride under sufficient pressure to maintain the mixture substantially in liquid phase. Upon completion of the reaction, the products are allowed to settle and a hydrocarbon layer is separated from the catalyst layer which comprises chiefly acid and sludge hydrocarbons. The catalyst phase is then treated for the recovery of hydrogen fluoride which may be reused in the process.

The hydrogen fluoride recovery treatment may comprise distillation, treatment with water, and/or aqueous alkali or other suitable means.

The material remaining after removal of hydrogen fluoride may be treated in a number of ways to remove any residual free acid. One method comprises either steam or vacuum distillation. In another method the catalyst layer may be commingled with water which serves to dissolve any free acid present, while the purified sludge hydrocarbons rise and may be withdrawn from the mixture.

In the casting of aluminum and magnesium, it has been found that when halide compounds are present in the sand cores the finishing and cleaning of the surfaces of the castings is greatly facilitated. Therefore, in instances where the sand cores are employed in the manufacture of castings from aluminum or magnesium, it is preferable that the core oil contain residual fluorides or chlorides in order that improved castings may be made. In such cases some of the above-mentioned purifying steps for the sludge hydrocarbons may be eliminated and the crude material used directly as the core binder.

In other cases it may be desirable to increase the viscosity of the material by bodying or co-bodying the sludge hydrocarbons with various natural drying oils, such as linseed oil, hempseed oil, fish oils, tung oil, soy bean oil, etc. This bodying or cobodying treatment may be brought about by heating the sludge hydrocarbons or a mixture of sludge hydrocarbons with the natural drying oil at a temperature and for a time such that the desired viscosity is reached.

In general about one part of sludge hydrocarbons is used to about 100 parts of sand by weight in making the cores, although the ratio may be as low as 1:20 and as high as 1:200. The formed cores may be dried by baking in an oven at temperatures between 250 and 550° F.

I claim as my invention:

1. A baked sand core consisting essentially of a mixture of from about 20 to about 200 parts by weight of sand with one part by weight of a hydrocarbon fraction; said fraction containing cyclic unsaturated hydrocarbons having a boiling range of from about 150° C. to about 450° C., an average molecular weight of from about 200 to about 400, a bromine number greater than 140, and a maleic anhydride value of from about 30 to about 90; and said fraction being obtained by reacting an olefin-containing hydrocarbon charge in the presence of a conversion catalyst selected from the group consisting of metal halides and hydrogen fluoride under such conditions as to form a catalyst-hydrocarbon complex phase, and separating the resultant reaction mixture into two layers, one of which is composed of the catalyst-hydrocarbon complex phase aforesaid and constitutes said hydrocarbon fraction.

2. A composition for forming cores consisting essentially of a mixture of from about 20 to about 200 parts by weight of sand with one part by weight of a hydrocarbon fraction; said fraction containing cyclic unsaturated hydrocarbons having a boiling range of from about 150° C. to about 450° C., an average molecular weight of from about 200 to about 400, a bromine number greater than 140, and a maleic anhydride value of from about 30 to about 90; and said fraction being obtained by reacting an olefin-containing hydrocarbon charge in the presence of a conversion catalyst selected from the group consisting of metal halides and hydrogen fluoride under such conditions as to form a catalyst-hydrocarbon complex phase, and separating the resultant reaction mixture into two layers, one of which is composed of the catalyst-hydrocarbon complex phase aforesaid and constitutes said hydrocarbon fraction.

3. A core oil consisting essentially of a mixture of a natural drying oil and a hydrocarbon fraction; said fraction containing cyclic unsaturated hydrocarbons having a boiling range of from about 150° C. to about 450° C., an average molecular weight of from about 200 to about 400, a bromine number greater than 140, and a maleic anhydride value of from about 30 to about 90; and said fraction being obtained by reacting an olefin-containing hydrocarbon charge in the presence of a conversion catalyst selected from the group consisting of metal halides and hydrogen fluoride under such conditions as to form a catalyst-hydrocarbon complex phase, and separating the resultant reaction mixture into two layers, one of which is composed of the catalyst-hydrocarbon complex phase aforesaid and constitutes said hydrocarbon fraction.

4. A baked sand core consisting essentially of a mixture of from about 20 to about 200 parts by weight of sand with one part by weight of a hydrocarbon fraction; said fraction containing cyclic unsaturated hydrocarbons having a boiling range of from about 150° C. to about 450° C., an average molecular weight of from about 200 to about 400, a bromine number greater than 140, and a maleic anhydride value of from about 30 to about 90; and said fraction being obtained by reacting an olefin-containing hydrocarbon charge in the presence of a hydrogen fluoride catalyst under such conditions as to form a hydrogen fluoride-hydrocarbon complex phase and separating the resultant reaction mixture into two layers, one of which is composed of the hydrogen fluoride-hydrocarbon complex phase aforesaid and constitutes said hydrocarbon fraction.

5. A composition for forming cores consisting essentially of a mixture of from about 20 to about 200 parts by weight of sand with one part by weight of a hydrocarbon fraction; said fraction containing cyclic unsaturated hydrocarbons having a boiling range of from about 150° C. to about 450° C., an average molecular weight of from about 200 to about 400, and a maleic anhydride value of from about 30 to about 90; and said fraction being obtained by reacting an olefin-containing hydrocarbon charge in the presence of a hydrogen fluoride catalyst under such conditions as to form a hydrogen fluoride-hydrocarbon complex phase and separating the resultant reaction mixture into two layers, one of which is composed of the hydrogen fluoride-hydrocarbon complex phase aforesaid and constitutes said hydrocarbon fraction.

6. A core oil consisting essentially of a mixture of a natural drying oil and a hydrocarbon fraction; said fraction containing cyclic unsaturated hydrocarbons having a boiling range of from about 150° C. to about 450° C., an average molecular weight of from about 200 to about 400, a bromine number greater than 140, and a maleic anhydride value of from about 30 to about 90; and said fraction being obtained by reacting an olefin-containing hydrocarbon charge in the presence of a hydrogen fluoride catalyst under such conditions as to form a hydrogen fluoride-hydrocarbon complex phase and separating the resultant reaction mixture into two layers, one of which is composed of the hydrogen fluoride-hydrocarbon complex phase aforesaid and constitutes said hydrocarbon fraction.

CHARLES L. THOMAS.

REFERENCES CITED

The following references are of record in the file of this patent:

UNITED STATES PATENTS

| Number | Name | Date |
| --- | --- | --- |
| 1,778,329 | Mason | Oct. 14, 1930 |
| 1,898,437 | Garm et al. | Feb. 21, 1933 |
| 1,902,419 | Plant et al. | Mar. 21, 1933 |
| 1,970,916 | Payne | Aug. 21, 1934 |
| 2,045,913 | Hoy | June 30, 1936 |
| 2,047,297 | Stahl | July 14, 1936 |
| 2,127,535 | Saeger | Aug. 23, 1938 |
| 2,143,930 | Anderson | Jan. 17, 1939 |
| 2,217,919 | Rostler | Oct. 15, 1940 |
| 2,228,527 | Meyer | Jan. 14, 1941 |
| 2,228,707 | Roberts et al. | Jan. 14, 1941 |
| 2,253,323 | Christmann | Aug. 19, 1941 |
| 2,274,618 | Remy | Feb. 24, 1942 |
| 2,328,622 | Crawford | Sept. 7, 1943 |
| 2,329,397 | D'Ouville | Sept. 14, 1943 |
| 2,394,522 | Pace | Feb. 5, 1946 |
| 2,440,459 | Bloch | Apr. 27, 1948 |